(12) United States Patent
Chen et al.

(10) Patent No.: US 7,257,431 B2
(45) Date of Patent: Aug. 14, 2007

(54) ELECTRIC SWIVELING MECHANISM FOR TWO AXES

(75) Inventors: Chung-Chih Chen, Taipei (TW);
Shao-Wen Kao, Taipei (TW);
Chih-Chuan Ke, Taipei County (TW);
Zheng-Kai Hu, Taipei County (TW)

(73) Assignee: Afreey Inc., Taipei County (TW)

( * ) Notice: Subject to any disclaimer, the term of this patent is extended or adjusted under 35 U.S.C. 154(b) by 197 days.

(21) Appl. No.: 11/190,931

(22) Filed: Jul. 28, 2005

(65) Prior Publication Data
US 2007/0025853 A1 Feb. 1, 2007

(51) Int. Cl.
*H04M 1/00* (2006.01)
(52) U.S. Cl. .................. 455/575.3; 455/557; 16/342

(58) Field of Classification Search ............. 455/556.1, 455/557, 575.1, 575.3, 575.8, 90.3; 16/342, 16/343, 374, 367; 361/681, 683, 803; 379/434, 379/433.13
See application file for complete search history.

(56) References Cited

U.S. PATENT DOCUMENTS

| | | | | |
|---|---|---|---|---|
| 5,335,142 | A | * | 8/1994 | Anderson .................. 361/681 |
| 6,658,272 | B1 | * | 12/2003 | Lenchik et al. .......... 455/575.1 |
| 6,850,407 | B2 | * | 2/2005 | Tanimoto et al. ............ 361/681 |
| 6,925,684 | B2 | * | 8/2005 | Kang et al. .................. 16/264 |
| 2004/0008477 | A1 | * | 1/2004 | Tseng et al. ................ 361/681 |
| 2005/0066477 | A1 | * | 3/2005 | Yang ........................... 16/374 |

* cited by examiner

*Primary Examiner*—Charles N. Appiah
*Assistant Examiner*—Joy Contee
(74) *Attorney, Agent, or Firm*—Rosenberg, Klein & Lee

(57) ABSTRACT

The present invention discloses a portable multimedia player which comprises a panel, a base, and an electric swiveling mechanism for two axes combining the panel and the base. The electric swiveling mechanism further comprises a first swiveling mechanism and a second swiveling mechanism for controlling yaw and pitch swiveling, respectively.

20 Claims, 7 Drawing Sheets

ELECTRIC SWIVELING MECHANISM FOR TWO AXES

BACKGROUND OF THE INVENTION

1. Field of the Invention

The present invention generally relates to swiveling mechanism, and more particularly to electric swiveling mechanism for two axes.

2. Description of the Prior Art

Consumer electronics such as portable multimedia player are getting popular in recent years. The portable multimedia player is small enough for portability and convenience for playing multimedia content anywhere and everywhere. Similar to conventional laptop computer, most portable multimedia player are designed as foldable style. In this foldable design, most electronic components and circuit boards are arranged inside a base and a display is placed in a foldable panel. The foldable panel and the base are jointed by a mechanism.

The panel is folded to the base for protecting the display and the console on the surface of the base when the conventional portable multimedia player and laptop are powered off. When multimedia or content is played, a pitch angle between the panel and the base is formed. Besides, some mechanism of some products may allow some degrees of rotation in yaw in convenience of users in the left or right side of the products. Conventionally, the mechanism, jointing the panel and the base, is rotated by hands for adjusting the angles in pitch and yaw. It is rare to see a mechanism driven by electric applying on these small consumer electronics. It may be reasoned as that the distance between the electronics and user is so close. The angle adjustment could be done directly by hands.

In addition, the portable multimedia player could be plugged to vehicles as passenger entertainment system. When the player is loaded, the distance between the passenger and the player may be longer than a full arm length. The vehicle movement may interrupt the handy adjustment operation, too. When considering remote control as a solution for difficulties above, there exists a need for an electric mechanism for adjusting the pitch and yaw angles of the panel. However, the volume and size of portable multimedia player is already highly constrained. Building an electric driven mechanism for such purpose is a big challenge. Hence the present invention provides an electric swiveling mechanism for two axes as a solution for the requirements.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

One object of this invention is to provide a portable multimedia player with an electric swiveling mechanism for two axes, which comprises a panel, a base, and said electric swiveling mechanism for interconnecting said panel and said base. The electric swiveling mechanism further comprising a first swiveling mechanism and a second swiveling mechanism. In this regards, the first swiveling mechanism comprises a base attachment for fixing said whole electric swiveling mechanism on a base, a first yaw gear and a second yaw gear on the same shaft, a third yaw gear, engaging at said second yaw gear, and a yaw driving motor on said base attachment. A worm gear on the shaft of said yaw driving motor is used to drive said first yaw gear, said second yaw gear, and said third yaw gear consequently. Besides, the second swiveling mechanism comprises a pitch driving motor, a pitch shaft rod, a tilt shaft rod, and a empty cylinder bearing structure for carrying a gear set supporting structure. The both ends of said pitch shaft rod comprising a plurality of panel attachment structures for fixing to a panel. The tilt shaft rod comprising a tilt gear for engaging at a worm gear on the driving shaft of said pitch driving motor 150 and a tilt worm gear for engaging at a pitch gear on said pitch shaft rod. The bearing structure can be fixed and rotated on said base attachment. The bearing structure further comprising a bearing gear underneath engaging to said third yaw gear. The gear set supporting structure is vertically fixed to the internal empty space of said bearing structure. A vertical wall of said gear set supporting structure further comprises a first shaft hole for the shaft of said pitch driving motor, a second shaft hole, located above said first shaft hole, for said pitch shaft rod, a first tilt shaft rod fulcrum and a second tilt shaft rod fulcrum for supporting the tilt shaft rod.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1A:
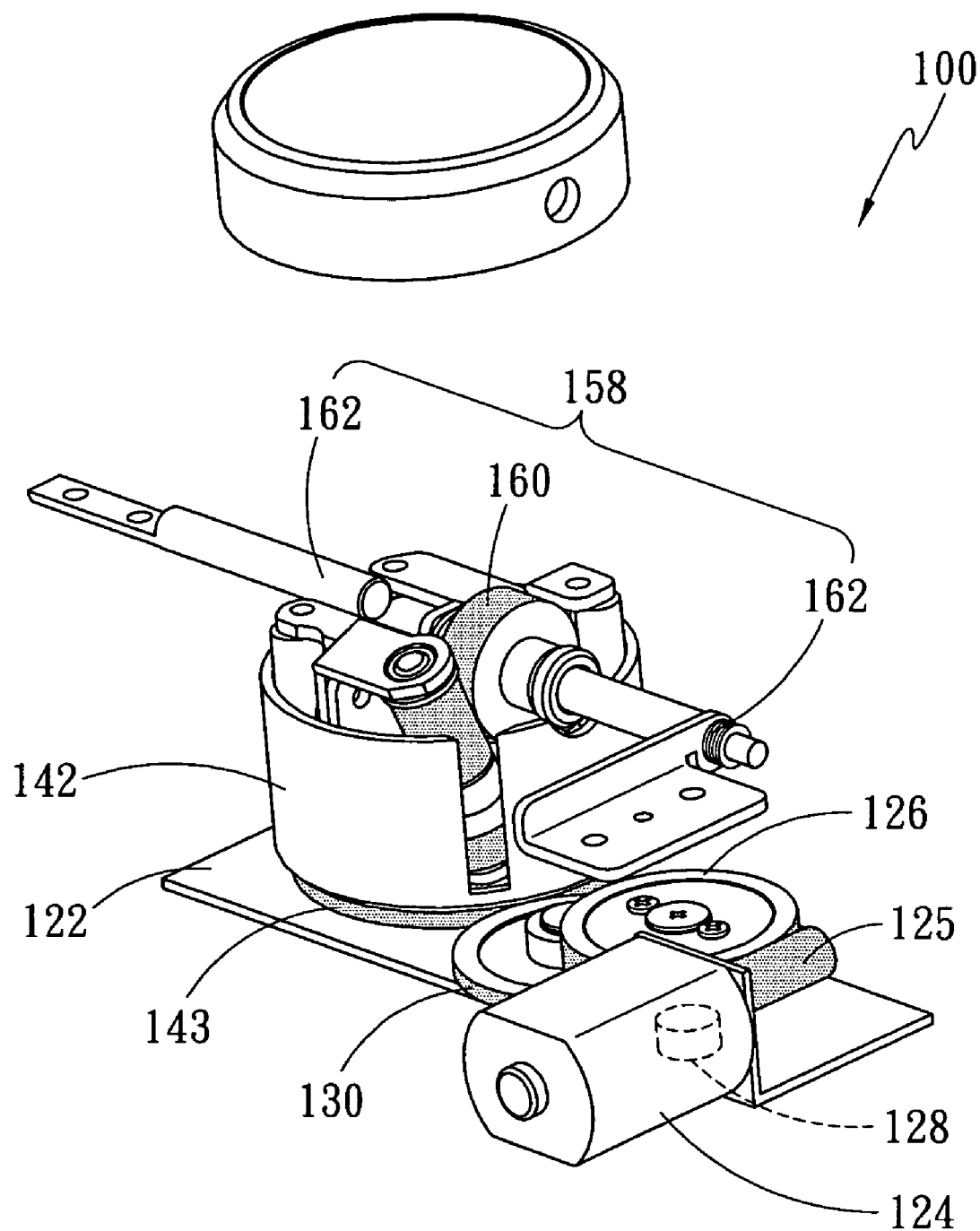
FIG. 1A to FIG. 1C are diagrams illustrate an electric swiveling mechanism for two axes.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 1B:
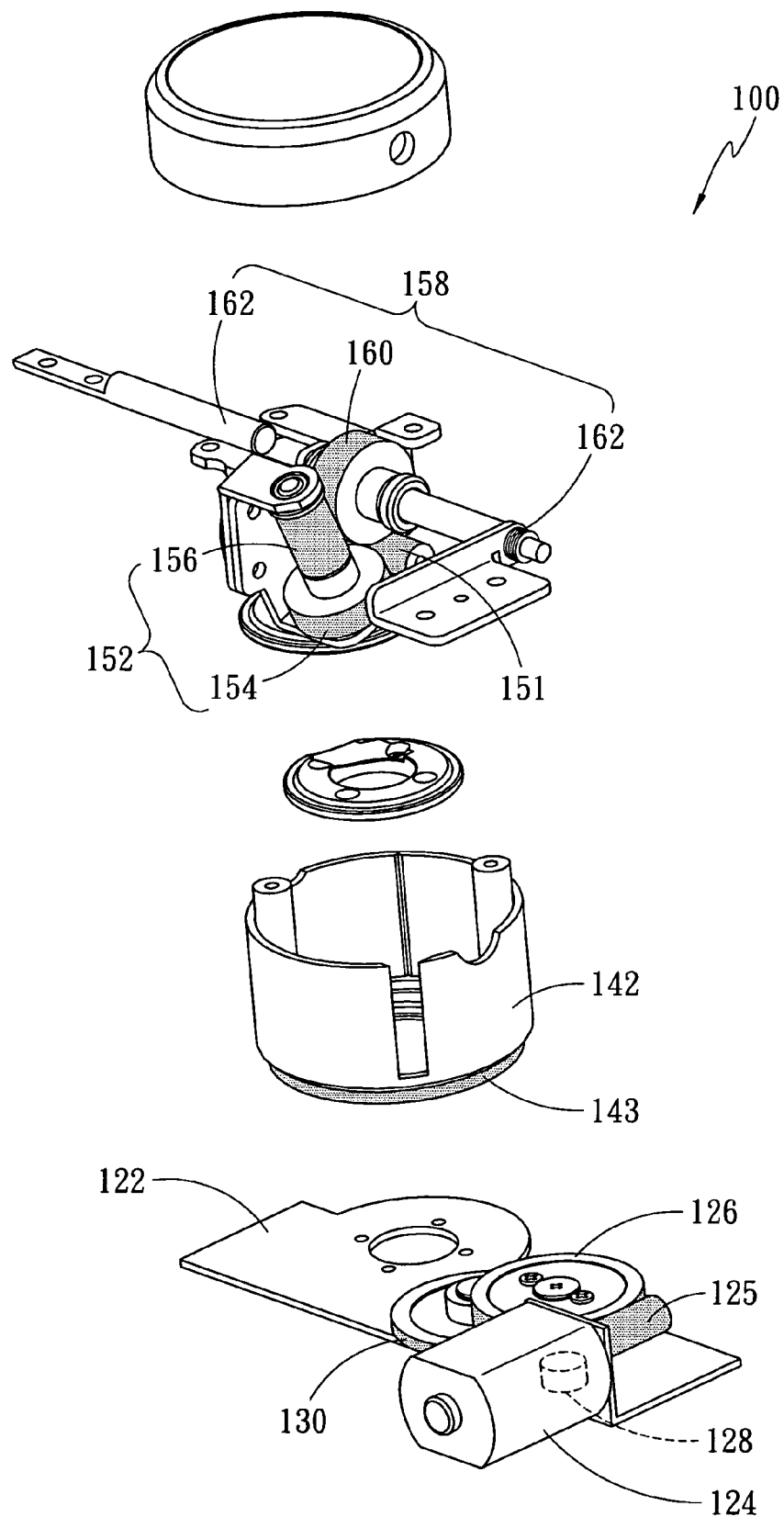
Figure 1C:
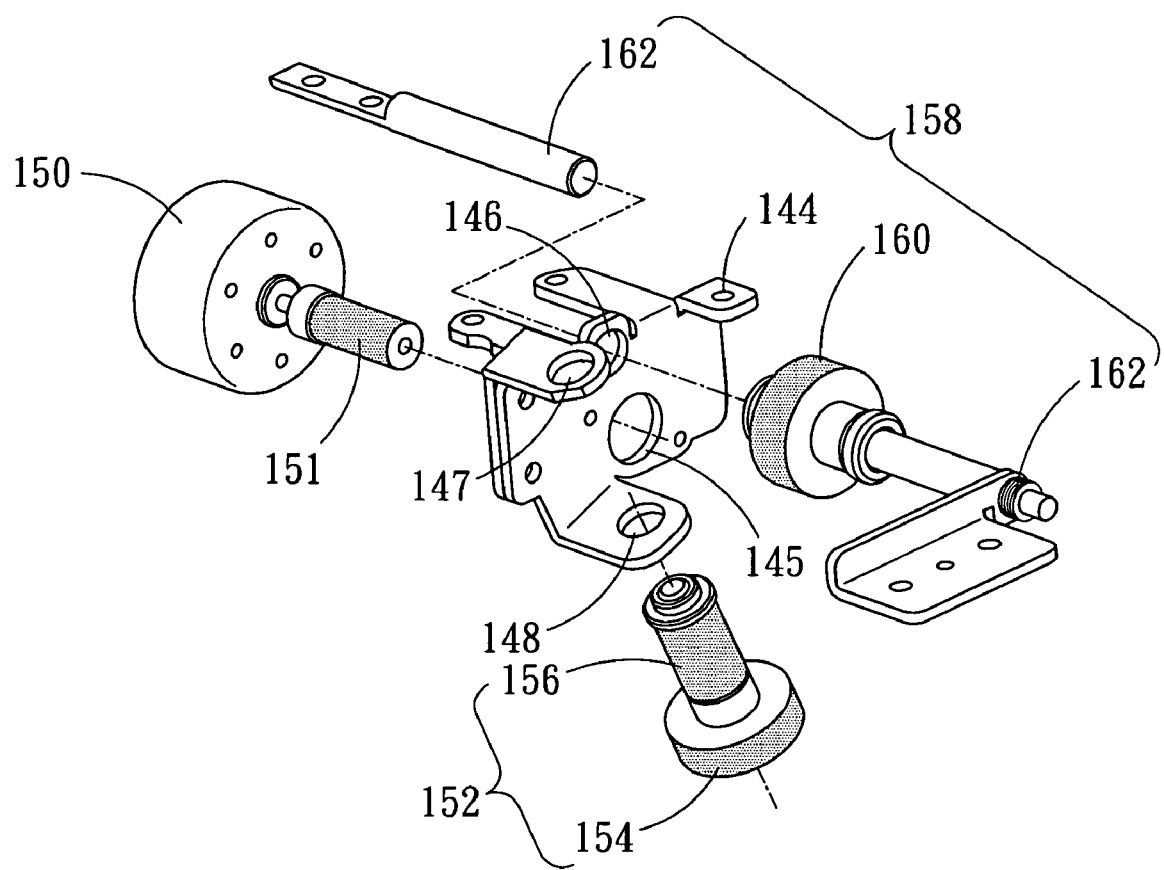

Please refer to FIG. 1A to FIG. 1C, which are diagrams illustrate an electric swiveling mechanism 100 for two axes. The mechanism 100 comprises a first swiveling mechanism 120 and a second swiveling mechanism 140. In this regards, the first swiveling mechanism 120 further comprises a base attachment 122 for fixing the whole electric swiveling mechanism 100 on the base, a yaw driving motor 124 on the base attachment 122, a first yaw gear 126 and a second yaw gear 128 sharing the same shaft, and a third yaw gear 130 engaging at the second yaw gear 128. The diameter of the first yaw gear 126 is greater than the second yaw gear 128 of the same shaft. Besides, the first and second yaw gears 126 and 128 may be implemented as a two-level gear. A worm gear 125 on the driving shaft of the yaw driving motor 124 is used to drive the first yaw gear 126. Hence the third yaw gear 130 could be driven by the second yaw gear 128, which shares the same shaft with the first yaw gear 126.

As shown in the FIGS. 1B and 1C, the second swiveling mechanism 140 comprises an empty cylinder bearing structure 142 to carry a gear set supporting structure 144, a pitch driving motor 150, a tilt shaft rod 152, and a pitch shaft rod 158. In this regards, the gear set supporting structure 144 is vertically fixed to the internal empty space of the bearing structure 142. The vertical wall of the gear set supporting structure 144 further comprising a first shaft hole 145 for the shaft of the pitch driving motor 150, a second shaft hole 146, which is located above the first shaft hole 145, for the pitch shaft rod 158, a first tilt shaft rod fulcrum 147 and a second tilt shaft rod fulcrum 148 for supporting the tilt shaft rod 152. Besides, the tilt shaft rod 152 further comprises a tilt gear 154 for engaging at a worm gear on the driving shaft of the pitch driving motor 150, and a tilt worm gear 156 for engaging at a pitch gear 160 on the pitch shaft rod 158. The diameter of the tilt gear 154 may be larger than the diameter of the tilt worm gear 156. In addition, the both ends of the pitch shaft rod 158 further comprise a plurality of panel attachment structures 162 for fixing to the panel. In such combination, the tilt gear 154 could be driven by the worn gear 151 on the driving shaft of the pitch driving motor 150. Moreover, the pitch gear 160 could be driven by the tilt worn gear 156, which is on the same tilt shaft rod 152. At last the pitch of the panel could be controlled by the rotation of the pitch shaft rod 158.

As shown in the FIG. 1A, the bearing structure 142 may be fixed and rotated on the base attachment 122. In this regards, the bearing structure 142 further comprises a bearing gear 143 underneath engaging to the third yaw gear 130. When the shaft of the yaw driving motor 124 rotates, the bearing structure 142 would be rotated accordingly. There exist friction combination mechanisms between the first and second yaw gears 126 and 128, and between the pitch shaft rod 158 and the plurality of panel attachment structures 162. When the panel is rotated by hands and the rotating force is greater than the friction provided by the friction combination mechanism, the correspondence between the first and second yaw gears 126 and 128 would be conquered and lost in order to protect the rack of the worm gear. Similarly, when the panel is pitched by hands and the rotating force is greater than the friction provided by the friction combination mechanism, the correspondence between the pitch shaft rod 158 and the plurality of panel attachment structures 162 would be conquered and lost in order to protect the rack of the worm gear.

In this embodiment, the pitch and yaw of the panel is come from the amplified torques by the gear trains of the first and second swiveling mechanisms 120 and 140. In one example of the embodiment, the torque of the yaw and pitch driving motors 124 and 150 could be amplified from 20 gw-cm to 20 kgw-cm. In another example of the embodiment, the yaw and pitch driving motors 124 and 150 are DC (direct current) motors providing high torque in low rotational speed. Hence, the rotational direction could be controlled by the direction of electric current. The yaw angle of the panel could be ranged in 225 degree and the pitch angle could be ranged in 180 degree.

Figure 2A:
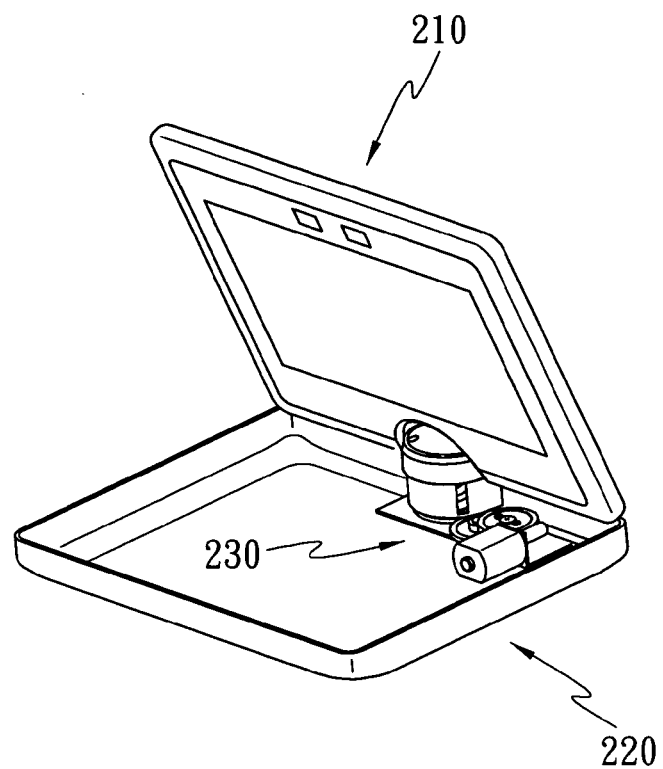
FIG. 2A is a diagram shows a portable multimedia player of an embodiment in accordance with the present invention.
Figure 2B:
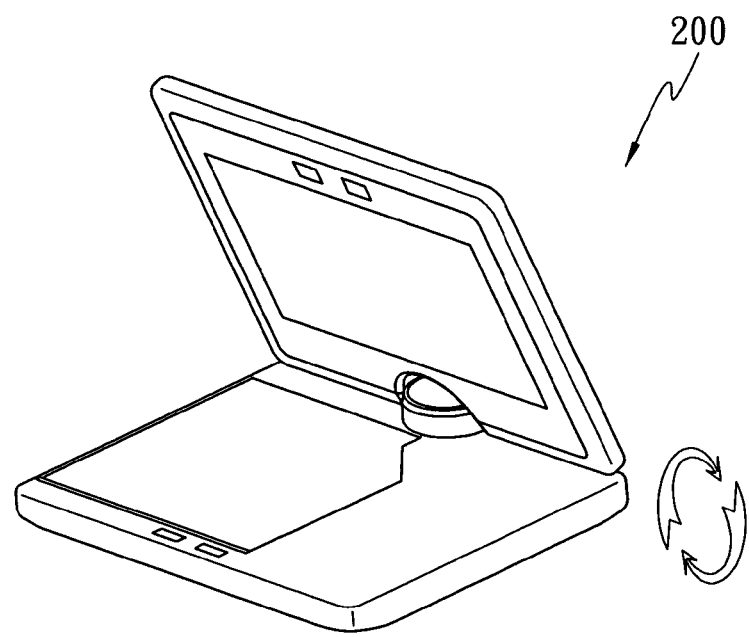
FIG. 2B is a diagram shows a portable multimedia player of an embodiment in accordance with the present invention.
Figure 2C:
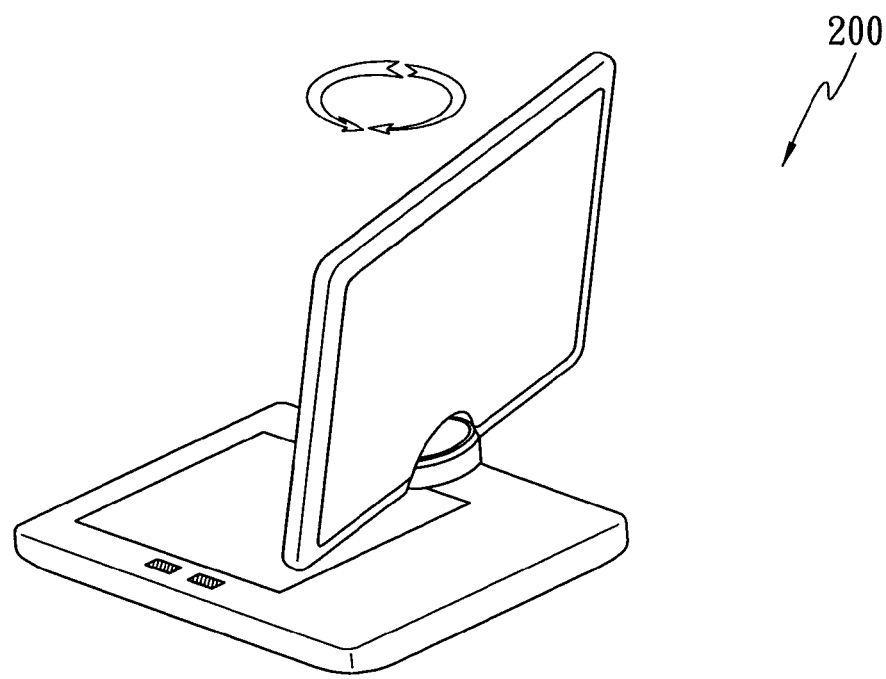
FIG. 2C is a diagram shows a portable multimedia player of an embodiment in accordance with the present invention.

Please refer to the FIG. 2A, which is a diagram shows a portable multimedia player 200 of an embodiment in accordance with the present invention. The portable multimedia player 200 comprises a panel 210, a base 220, and an electric swiveling mechanism 230 for interconnecting the panel 210 and the base 220. Please refer to the FIG. 2B; the pitch angle of the panel 210 could be controlled by the electric swiveling mechanism 230. Please refer to the FIG. 2C; the yaw angle of the panel 210 could be controlled by the electric swiveling mechanism 230.

Figure 2D:
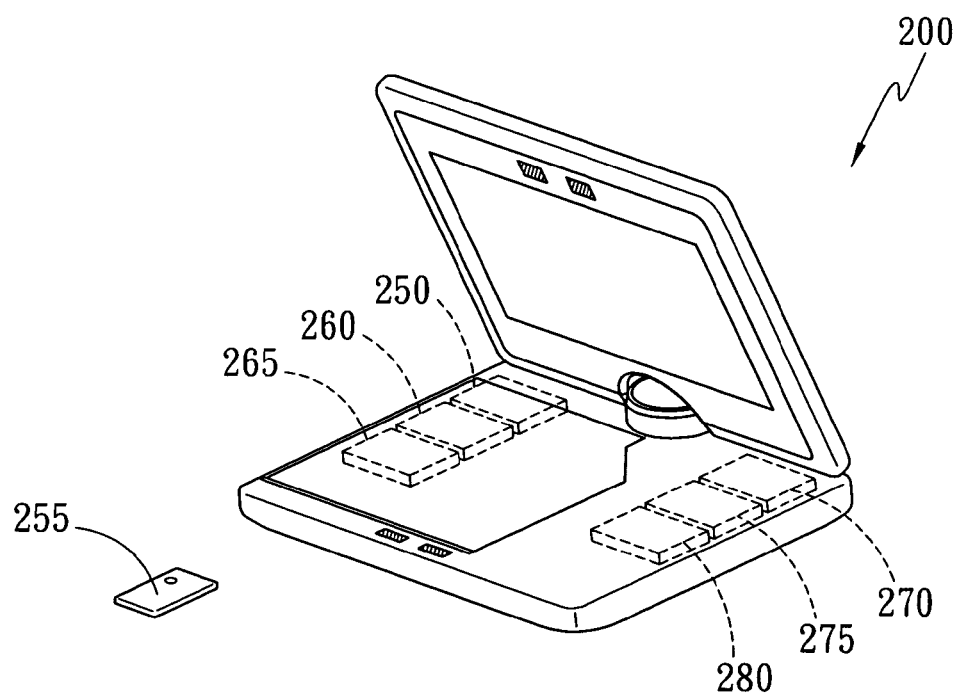
FIG. 2D is a diagram shows a portable multimedia player of an embodiment in accordance with the present invention.

Please refer to FIG. 2D, the portable multimedia player 200 may further comprises a retractable optical driver 240, a magnet movement apparatus 245, a touch console 250, a touch remote control module 255, a RF (radio frequency) broadcaster 260, a wireless telephone module 265, a wireless network module 270, a television receiving module 275, and a power-saving module 280. In this regards, the touch console 250 could sense the object on the surface of the console by the electronic charges. Moreover, the gathered information by the sensor is sent to a microprocessor 290 for executing the input commands of the user. Conventional buttoned console is replaced by the touch console without concerning with the size, pressure, and reliability of the conventional buttons. Similarly, the touch remote control module 255 takes the advantage for providing remote control capability of the portable multimedia player 200.

Besides, the RF broadcaster 260 could transmit output audio signal to conventional FM (Frequency Modulation) radio receiver. For example, when the portable multimedia player 200 is placed inside the vehicle, the output audio could be played by the powerful stereo system of the vehicle rather than be played by the portable multimedia player 200 itself. In addition, with the help of the wireless telephone module 265, the portable multimedia player 200 could be taken as a wireless telephone for talking 2 G/3 G telephone and/or conducting 3 G video conference call. Similarly, wireless networking capability of the portable multimedia player 200 could be achieved with the wireless network module 270. Furthermore, analog and digital television signal and digital audio broadcast signal could be received by the television receiving module 275. Hence the portable multimedia player 200 could display television and play digital audio signal. At last, the power saving module 280 could turn off the power after idling for a while in order to save valuable battery power.

Figure 3A:
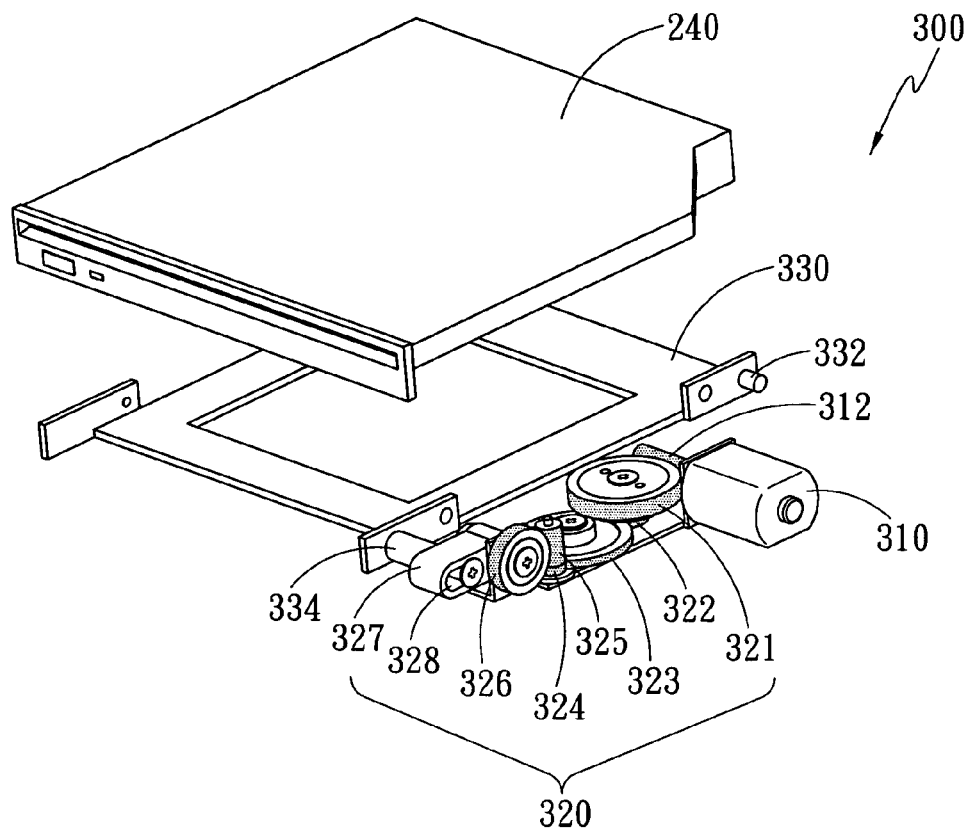
FIG. 3A is a diagram illustrates a lift mechanism of the retractable optical driver shown in the FIG. 2D.

Please refer to FIG. 3A, which illustrates a lift mechanism 300 of the retractable optical driver 240 shown in the FIG. 2D. In this regards, the retractable optical driver 240 is a disc-inhale driver. The disc-inhale open could be concealed and buried inside the base. When the user tries to insert or change the disc, the disc-inhale open of the retractable optical driver 240 could be lifted by the lift mechanism 300. The lift mechanism 300 comprising a lift driving motor 310, a gear train 320, and a driver mount 330 for mounting the optical driver 240. The torque provided by the lift driving motor 310 could be amplified by the gear train 320 for lifting or concealing the optical driver 240.

As shown in the FIG. 3A, the driver mount 330 could be rotated around an axis 332. A mount rod 334 of the lifting end of the driver mount 330 is linked to the gear train 320. In this embodiment, the gear train 320 comprises a first lift gear 321 and a second lift gear 322 sharing the same shaft, a third lift gear 323 engaging at the second lift gear 322, a fourth lift gear 324 engaging at the third lift gear 323, a worm gear rod 325 sharing the same shaft of the fourth lift gear 324, a fifth lift gear 326 engaging at the worm gear rod 325, and a rotation lift mechanism 327 attaching to the shaft of the fifth lift gear 326. The movement of the mount rod 334 is constrained in an elongated hole 328 of the rotation lift mechanism 327. The position of the mount rod 334 is corresponding to the lift position of the driver mount 330. Besides, the diameter of the first lift gear 321 is larger than the second lift gear 332 in order to amplify the torque provided by a worm gear rod on the shaft of the lift driving motor 310.

Figure 3B:
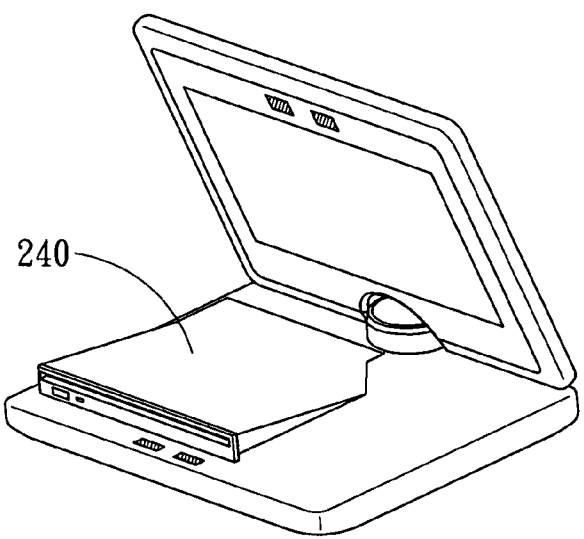
FIG. 3B is a diagram shows the retractable optical driver in the lifting position.

Please refer to the FIG. 3B, which shows the retractable optical driver 240 in the lifting position. In this embodiment, there exists a friction combination mechanism between the fifth lift gear 326 and its shaft. When the driver 240 is pushed by hands and the pushing force is larger than the friction, the correspondence between the fifth lift gear 326 and its shaft would be conquered and lost in order to protect the rack of the worm gear.

Figure 4A:
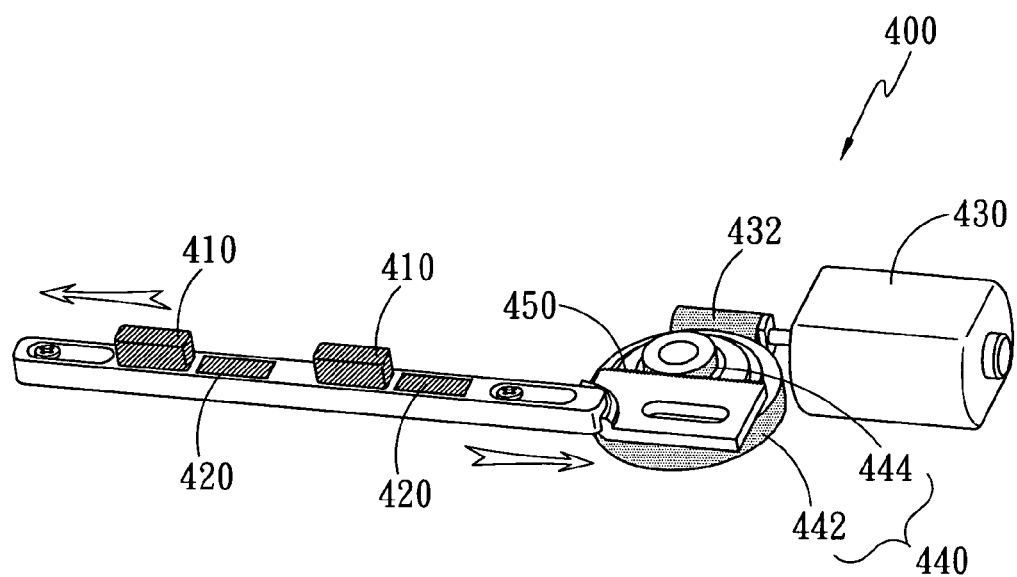
FIG. 4A is a diagram shows a magnet movement apparatus of an embodiment in accordance with the present invention.

Please refer to the FIG. 4A, which shows a magnet movement apparatus 400 of the embodiment. The open ends of the panel 210 and base 220 are fixed together by the attraction force of a panel magnet set 410 and a base magnet set 420. However, the torque provided by the electric swiveling mechanism could not conquer the attraction force between the magnet sets 410 and 420 for lifting the panel. The tie between the magnet sets 410 and 420 has to being broken by moving one of the magnet sets away. In this embodiment, the magnet movement apparatus 400 may comprises a driving motor 430, a gear train 440, and a rack 450 attached to the base magnet set 420.

Figure 4B:
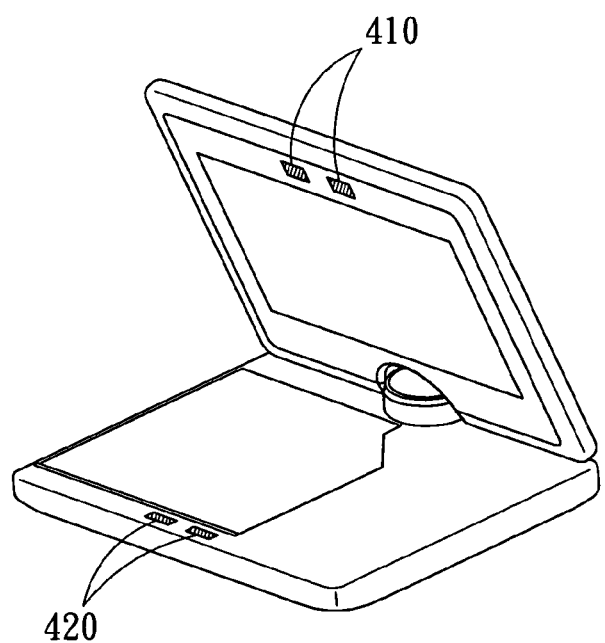
FIG. 4B is a diagram shows the magnet movement apparatus of the embodiment in accordance with the present invention

As shown in the FIG. 4A, the gear train 440 may comprises a first movement gear 442 and a second movement gear 444 on the same shaft. The first movement gear 442 is engaged at a worm gear 432 on the shaft of the driving motor 430. Besides, the diameter of the first movement gear 442 is larger than the second movement gear 444 in order to amplify the torque. In addition, there may exists a friction combination mechanism between the first movement gear 442 and the second movement gear 444. When the base magnet set 420 is pushed by hands and the pushing force is larger than the friction, the correspondence between first movement gear 442 and the second movement gear 444 would be conquered and lost in order to protect the rack of the worm gear. Please refer to the FIG. 4B, which shows the magnet movement apparatus 400 of the embodiment.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. An electric swiveling mechanism for two axes, comprising:
   a first swiveling mechanism, comprising:
      a base attachment for fixing said whole electric swiveling mechanism on a base;
      a first yaw gear and a second yaw gear on the same shaft, wherein the diameter of said first yaw gear is greater than said second yaw gear;
      a third yaw gear, engaging at said second yaw gear; and
      a yaw driving motor on said base attachment, wherein a worm gear on the shaft of said yaw driving motor is used to drive said first yaw gear, said second yaw gear, and said third yaw gear consequently; and
   a second swiveling mechanism, comprising:
      a pitch driving motor;
      a pitch shaft rod, wherein the both ends of said pitch shaft rod comprising a plurality of panel attachment structures for fixing to a panel;
      a tilt shaft rod, wherein said tilt shaft rod comprising a tilt gear for engaging at a worm gear on the driving shaft of said pitch driving motor 150 and a tilt worm gear for engaging at a pitch gear on said pitch shaft rod;
      a empty cylinder bearing structure for carrying a gear set supporting structure, wherein said bearing structure can be fixed and rotated on said base attachment, said bearing structure further comprising a bearing gear underneath engaging to said third yaw gear, said gear set supporting structure is vertically fixed to the internal empty space of said bearing structure, a vertical wall of said gear set supporting structure further comprising:
         a first shaft hole for the shaft of said pitch driving motor;
         a second shaft hole, located above said first shaft hole, for said pitch shaft rod; and
         a first tilt shaft rod fulcrum and a second tilt shaft rod fulcrum for supporting the tilt shaft rod.

2. An electric swiveling mechanism for two axes of claim 1, wherein there exists a friction combination mechanism between said first and second yaw gears, when said panel is rotated and the rotating force is greater than the friction provided by said friction combination mechanism, the correspondence between said first and second yaw gears is lost for protecting the rack of said worm gear.

3. An electric swiveling mechanism for two axes of claim 1, wherein there exists a friction combination mechanism between said pitch shaft rod and said plurality of panel attachment structures, when said panel is rotated and the rotating force is greater than the friction provided by said friction combination mechanism, the correspondence between said pitch shaft rod and said plurality of panel attachment structures is lost for protecting the rack of said worm gear.

4. An electric swiveling mechanism for two axes of claim 1, wherein said yaw and said pitch driving motors are DC (direct current) motors providing high torque in low rotational speed, the rotational direction could be controlled by the direction of electric current, the yaw angle of the panel is ranged in 225 degree and the pitch angle is ranged in 180 degree.

5. An electric swiveling mechanism for two axes of claim 1, wherein said panel and said base is belonged to a portable multimedia player.

6. An electric swiveling mechanism for two axes of claim 5, wherein said portable multimedia player further comprising a magnet movement apparatus for locking said panel and said base by magnetic attraction force.

7. A portable multimedia player with an electric swiveling mechanism for two axes, comprising a panel, a base, and said electric swiveling mechanism for interconnecting said panel and said base, wherein said electric swiveling mechanism further comprising:
   a first swiveling mechanism, comprising:
      a base attachment for fixing said whole electric swiveling mechanism on a base;
      a first yaw gear and a second yaw gear on the same shaft, wherein the diameter of said first yaw gear is greater than said second yaw gear;
      a third yaw gear, engaging at said second yaw gear; and
      a yaw driving motor on said base attachment, wherein a worm gear on the shaft of said yaw driving motor is used to drive said first yaw gear, said second yaw gear, and said third yaw gear consequently; and
   a second swiveling mechanism, comprising:
      a pitch driving motor;
      a pitch shaft rod, wherein the both ends of said pitch shaft rod comprising a plurality of panel attachment structures for fixing to a panel;
      a tilt shaft rod, wherein said tilt shaft rod comprising a tilt gear for engaging at a worm gear on the driving shaft of said pitch driving motor 150 and a tilt worm gear for engaging at a pitch gear on said pitch shaft rod;
      a empty cylinder bearing structure for carrying a gear set supporting structure, wherein said bearing structure can be fixed and rotated on said base attachment, said bearing structure further comprising a bearing gear underneath engaging to said third yaw gear, said gear set supporting structure is vertically fixed to the internal empty space of said bearing structure, a vertical wall of said gear set supporting structure further comprising:
         a first shaft hole for the shaft of said pitch driving motor;
         a second shaft hole, located above said first shaft hole, for said pitch shaft rod; and
         a first tilt shaft rod fulcrum and a second tilt shaft rod fulcrum for supporting the tilt shaft rod.

8. A portable multimedia player with an electric swiveling mechanism for two axes of claim 7, wherein there exists a friction combination mechanism between said first and second yaw gears, when said panel is rotated and the rotating force is greater than the friction provided by said friction combination mechanism, the correspondence between said first and second yaw gears is lost for protecting the rack of said worm gear.

9. A portable multimedia player with an electric swiveling mechanism for two axes of claim 7, wherein there exists a friction combination mechanism between said pitch shaft rod and said plurality of panel attachment structures, when said panel is rotated and the rotating force is greater than the friction provided by said friction combination mechanism, the correspondence between said pitch shaft rod and said plurality of panel attachment structures is lost for protecting the rack of said worm gear.

10. A portable multimedia player with an electric swiveling mechanism for two axes of claim 7, wherein said yaw and said pitch driving motors are DC (direct current) motors providing high torque in low rotational speed, the rotational direction could be controlled by the direction of electric current, the yaw angle of the panel is ranged in 225 degree and the pitch angle is ranged in 180 degree.

11. A portable multimedia player with an electric swiveling mechanism for two axes of claim 7, further comprising a retractable optical driver for playing multimedia content on optical discs.

12. A portable multimedia player with an electric swiveling mechanism for two axes of claim 7, further comprising a magnet movement apparatus for locking said panel and said base by magnetic attraction force.

13. A portable multimedia player with an electric swiveling mechanism for two axes of claim 12, wherein said magnet movement apparatus comprising a driving motor, a gear train, and a rack attached to a base magnet set, said gear train comprising a first movement gear and a second movement gear on the same shaft, said first movement gear is engaged at a worm gear on the shaft of said driving motor, the diameter of said first movement gear is larger than said second movement gear in order to amplify the torque.

14. A portable multimedia player with an electric swiveling mechanism for two axes of claim 7, further comprising a touch console for controlling said portable multimedia player and said electric swiveling mechanism for two axes.

15. A portable multimedia player with an electric swiveling mechanism for two axes of claim 7, further comprising a touch remote control console for controlling said portable multimedia player and said electric swiveling mechanism for two axes.

16. A portable multimedia player with an electric swiveling mechanism for two axes of claim 7, further comprising a RF (Radio Frequency) broadcaster for transmitting output audio signal into RF signal.

17. A portable multimedia player with an electric swiveling mechanism for two axes of claim 7, further comprising a wireless telephone module for communicating with wireless telephone networks.

18. A portable multimedia player with an electric swiveling mechanism for two axes of claim 7, further comprising a wireless local area network module for communicating with wireless local area networks.

19. A portable multimedia player with an electric swiveling mechanism for two axes of claim 7, further comprising a television signal receiver for playing received television signal.

20. A portable multimedia player with an electric swiveling mechanism for two axes of claim 7, further comprising a power saving module for turning off said portable multimedia player after idle for a while.

* * * * *